(12) United States Patent
Zhu et al.

(10) Patent No.: US 9,301,160 B2
(45) Date of Patent: Mar. 29, 2016

(54) NETWORK SUPERVISED DEVICE-TO-DEVICE COMMUNICATION

(71) Applicant: FUJITSU LIMITED, Kawasaki-shi, Kanagawa (JP)

(72) Inventors: Chenxi Zhu, Fairfax, VA (US); Dorin Viorel, Calgary (CA); Huy Dung Han, Santa Clara, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 13/830,342

(22) Filed: Mar. 14, 2013

(65) Prior Publication Data

US 2014/0269528 A1    Sep. 18, 2014

(51) Int. Cl.
*H04W 24/02*    (2009.01)

(52) U.S. Cl.
CPC ..................... *H04W 24/02* (2013.01)

(58) Field of Classification Search
CPC .................................................... H04W 24/02
See application file for complete search history.

(56) References Cited

U.S. PATENT DOCUMENTS

| 2007/0082732 | A1 | 4/2007 | Krummel et al. | |
|---|---|---|---|---|
| 2009/0319673 | A1 | 12/2009 | Peters | |
| 2011/0078445 | A1* | 3/2011 | Xiao et al. | 713/171 |
| 2012/0050153 | A1 | 3/2012 | Dvortsov et al. | |
| 2012/0163252 | A1* | 6/2012 | Ahn et al. | 370/280 |
| 2013/0102314 | A1* | 4/2013 | Koskela et al. | 455/436 |
| 2013/0336230 | A1* | 12/2013 | Zou et al. | 370/329 |
| 2014/0086152 | A1* | 3/2014 | Bontu et al. | 370/329 |

OTHER PUBLICATIONS

International Search Report and Written Opinion dated Aug. 25, 2014in application No. PCT/US2014/028672.
RP-122009, Study on LTE Device to Device Proximity Services, 3GPP TSG RAN #58, Dec. 4-7, 2012, Barcelona, Spain.
RP-121699, Qualcomm Inc., Background on "LTE D2D Proximity Services" Study Item proposal, 3GPP TSG RAN #58, Dec. 4-7, 2012, Barcelona, Spain.
3rd Generation Partnership Project;Technical Specification Group Radio Access Network; Evolved Universal Terrestrial Radio Access (E-UTRA); Physical channels and modulation (Release 10), TS.36.211-a10, Dec. 2011.
3rd Generation Partnership Project;Technical Specification Group Radio Access Network; Evolved Universal Terrestrial Radio Access (E-UTRA); Multiplexing and channel coding (Release 10), TS.36.212-a10, Dec. 2011.
3rd Generation Partnership Project;Technical Specification Group Radio Access Network; Evolved Universal Terrestrial Radio Access (E-UTRA); Physical layer procedures (Release 10), TS.36.213-a10, Dec. 2011.

* cited by examiner

*Primary Examiner* — Charles C Jiang
*Assistant Examiner* — Thad Defauw
(74) *Attorney, Agent, or Firm* — Maschoff Brennan

(57) ABSTRACT

A method of supervising device-to-device communication may include determining that a first wireless device and a second wireless device are configured to communicate with each other through device-to-device communication as a device-to-device pair. The method may further include assigning a pair identifier to the device-to-device pair. The pair identifier may be configured to allow the device-to-device pair to communicate with each other and an access point of a wireless communication network while protecting from eavesdropping. Further, the method may include directing the first wireless device and the second wireless device to use the pair identifier while participating in the device-to-device communication.

26 Claims, 3 Drawing Sheets

NETWORK SUPERVISED DEVICE-TO-DEVICE COMMUNICATION

FIELD

The present disclosure relates to network supervised device-to-device communication.

BACKGROUND

The proliferation of smartphones, tablets, laptop computers and other electronic devices (referred to generally as "wireless devices") that use wireless communication networks has created an increasing demand for ubiquitous and continuous wireless voice and data access. Device-to-device (D2D) communication may help satisfy this demand. For example, D2D communication may be performed between wireless devices and may allow the wireless devices to capture information and communicate the information with each other. This D2D communication may allow for reuse of wireless communication resources, which may help satisfy the demand for wireless voice and data access.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of supervising device-to-device communication may include determining that a first wireless device and a second wireless device are configured to communicate with each other through device-to-device communication as a device-to-device pair. The method may further include assigning a pair identifier to the device-to-device pair. The pair identifier may be configured to allow the device-to-device pair to communicate with each other and an access point of a wireless communication network while protecting from eavesdropping. Further, the method may include directing the first wireless device and the second wireless device to use the pair identifier while participating in the device-to-device communication.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

In particular embodiments, and, as described in further detail below, a wireless communication network may be configured to determine that a first wireless device and a second wireless device are configured to communicate with each other through device-to-device (D2D) communication as a D2D pair. As used herein, a "D2D pair" may be a pair of wireless devices, such as the first wireless device and the second wireless device, that may communicate with each other through D2D communication. As described in further detail below, the wireless communication network may be configured to supervise the D2D communication between the D2D pair. By managing the D2D communication between the D2D pair, the first and second wireless devices of the D2D pair may perform D2D communication while not having to expose sensitive information such as, but not limited to, their location, unique equipment identifiers, etc., to each other and/or other wireless devices.

Embodiments of the present disclosure will be explained with reference to the accompanying drawings.

Figure 1:
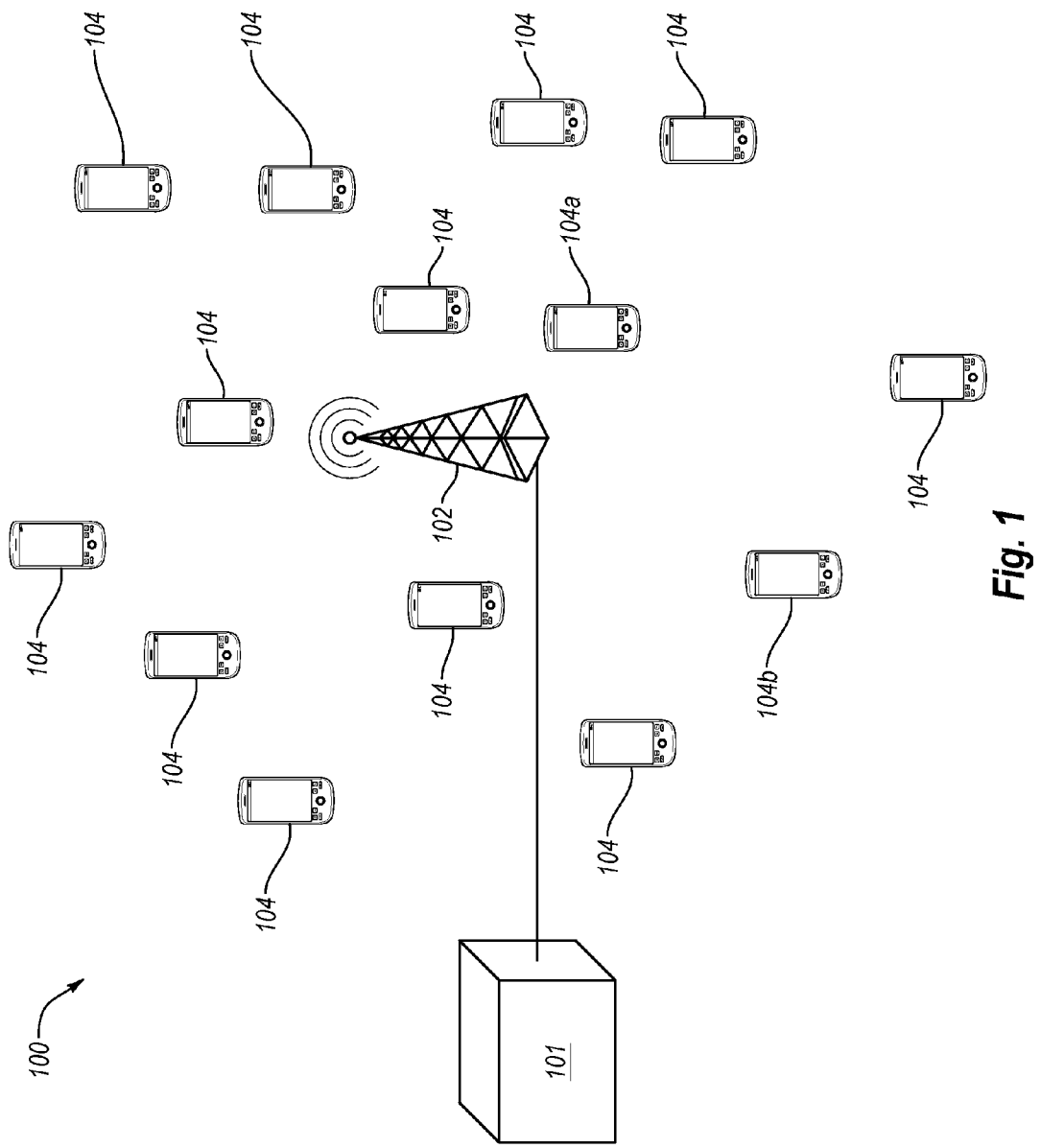
FIG. 1 illustrates an example wireless communication network configured to supervise device-to-device (D2D) communication between a pair of wireless devices.

FIG. 1 illustrates an example wireless communication network 100 (referred to hereinafter as "network 100") configured to supervise D2D communication between a D2D pair of wireless devices, according to at least some embodiments of the present disclosure. The network 100 may be configured to provide wireless communication services to one or more wireless devices 104 via one or more access points 102. The wireless communication services may be voice services, data services, messaging services, and/or any suitable combination thereof. The network 100 may include a Frequency Division Multiple Access (FDMA) network, an Orthogonal FDMA (OFDMA) network, a Code Division Multiple Access (CDMA) network, a Time Division Multiple Access (TDMA) network, and/or some other wireless communication network. In some embodiments, the network 100 may be configured as a third generation (3G) wireless communication network and/or a fourth generation (4G) wireless communication network. In these and other embodiments, the network 100 may be configured as a long term evolution (LTE) wireless communication network.

The network 100 may also include a network control unit 101. In some embodiments, the network control unit 101 may be included with and at the access point 102. In other embodiments, the network control unit 101 may be remote from the access point 102. The network control unit 101 may be associated with a core network architecture of a core network of the network 100 and may be configured to perform operations associated with a core network protocol. For example, the network control unit 101 may be included with a Mobility Management Entity (MME), a Serving Gateway (SGW), or a Packet Gateway (PGW) of an LTE core network.

The access point 102 may be any suitable wireless communication network communication point and may include, by way of example but not limitation, a base station, an evolved node B (eNB) base station, a remote radio head (RRH), or any other suitable communication point. The wireless devices 104 may include any device that may use the network 100 for obtaining wireless communication services and may include, by way of example and not limitation, a cellular phone, a smartphone, a personal data assistant (PDA), a laptop computer, a personal computer, a tablet computer, or any other similar device.

As mentioned above, in some embodiments, the network 100 may be configured to supervise D2D communication between wireless devices 104. In some of these embodiments, the access point 102 may supervise the D2D communication between a D2D pair.

Figure 2:
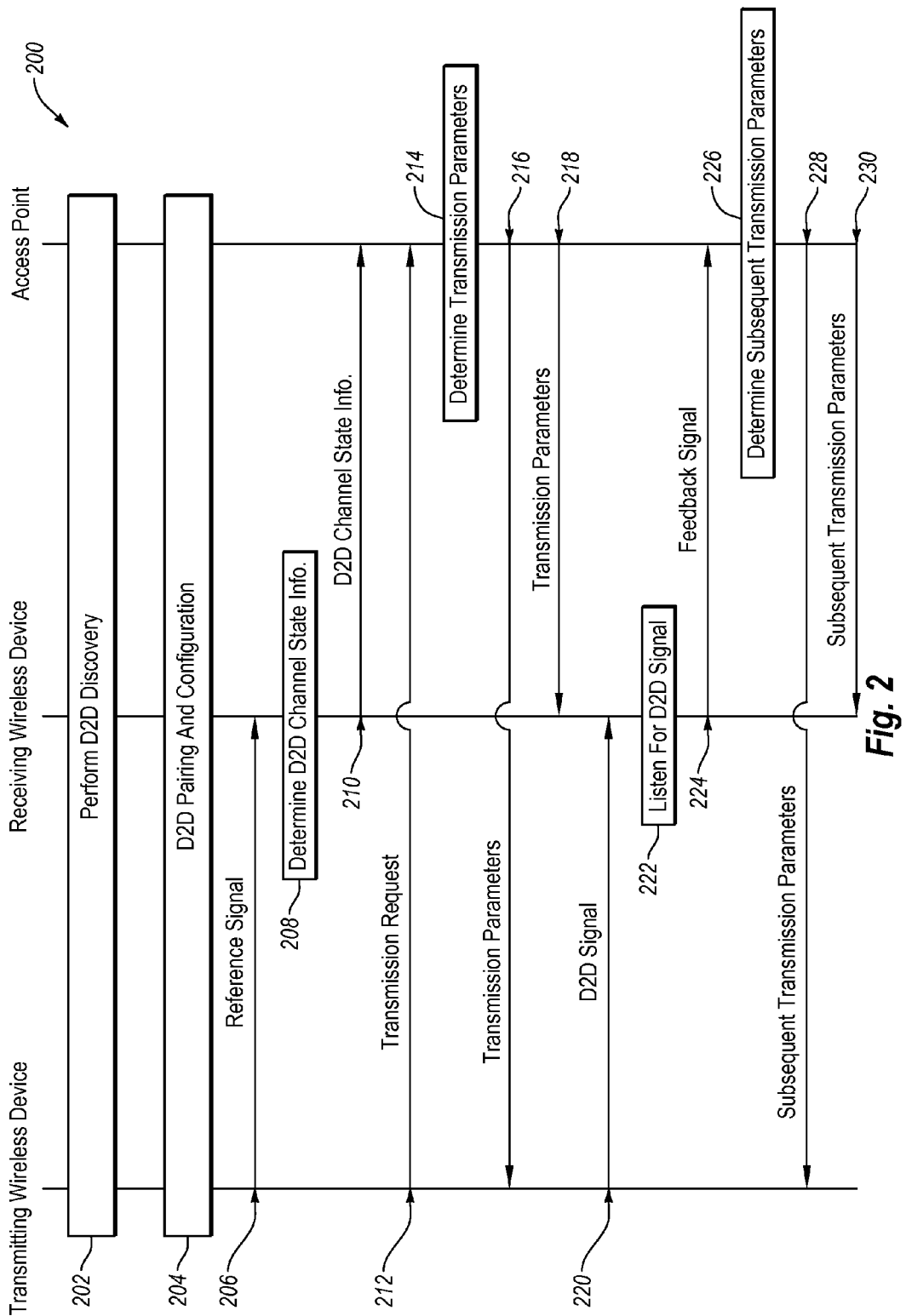
FIG. 2 illustrates an example signaling sequence for supervising D2D communication between a pair of wireless devices.

For example, a wireless device 104a and a wireless device 104b may be a D2D pair configured to participate in D2D communication with each other. The access point 102 may be configured to control and manage the D2D communication between the wireless device 104a and the wireless device 104b. In the illustrated embodiment, the wireless device 104a is described as transmitting D2D signals to the wireless device 104b. Therefore, the wireless device 104a may be referred to as a "transmitting" wireless device. In the illustrated embodiments, the wireless device 104b is described as receiving D2D signals from the wireless device 104a and thus may be referred to as a "receiving" wireless device. However, the wireless device 104a may act as a receiving wireless device and the wireless device 104b may act as a transmitting wireless device in other situations. FIG. 2 illustrates a more detailed manner in which the access point 102 may manage and direct the D2D communication between the transmitting wireless device 104a and the receiving wireless device 104b.

Modifications, additions, or omissions may be made to FIG. 1 without departing from the scope of the present disclosure. For example, the network 100 may include any number of access points 102 and wireless devices 104. Additionally, the D2D communication between any number of D2D pairs may be directed and managed by the access point 102. Further, the transmitting wireless device 104a and/or the receiving wireless device 104b may be included in other D2D pairs.

FIG. 2 illustrates an example signaling sequence 200 for supervising D2D communication between a D2D pair, according to at least some embodiments of the present disclosure. One or more steps of the signaling sequence 200 may be performed by an access point such as the access point 102 of FIG. 1, a transmitting wireless device such as the transmitting wireless device 104a of FIG. 1, and a receiving wireless device such as the receiving wireless device 104b of FIG. 1.

The signaling sequence 200 may begin and at a step 202, the transmitting wireless device and the receiving wireless device may perform D2D discovery. For example, the transmitting wireless device may transmit a neighbor discovery signal and the receiving wireless device may receive the neighbor discovery signal. In the illustrated embodiment, the access point may manage the D2D discovery such as described in U.S. patent application Ser. No. 13/828,457 by Zhu et al., filed on Mar. 14, 2013 and entitled "NETWORK SUPERVISED WIRELESS DEVICE NEIGHBOR DISCOVERY" and such as described in U.S. patent application Ser. No. 13/828,617 by Zhu et al., filed on Mar. 14, 2013 and entitled "POWER CONTROL OF NEIGHBOR DISCOVERY SIGNALS", the entire contents of both of which are incorporated herein by reference. In other embodiments, the access point may manage the D2D discovery between the transmitting wireless device and the receiving wireless device in some suitable manner other than that described in U.S. application Ser. Nos. 13/828,457 and 13/828,617. In yet other embodiments, the transmitting wireless device and the receiving wireless device may perform D2D discovery without direction from the access point.

At step 204, the transmitting wireless device and the receiving wireless device may initiate D2D pairing such that the transmitting wireless device and the receiving wireless device may be configured as a D2D pair. In the illustrated embodiment, the access point may direct the transmitting wireless device and the receiving wireless device to initiate D2D pairing such as described in U.S. patent application Ser. Nos. 13/828,457 and 13/828,617, which are incorporated by reference above. In other embodiments, the access point may direct the transmitting wireless device and the receiving wireless device to initiate D2D pairing in some suitable manner other than that described in U.S. application Ser. Nos. 13/828,457 and 13/828,617. In yet other embodiments, the transmitting wireless device and the receiving wireless device may initiate D2D pairing between each other without direction from the access point, but may indicate to the access point that they are configured as a D2D pair.

At step 206, the transmitting wireless device may communicate a reference signal to the receiving wireless device. At step 208, the receiving wireless device may estimate information associated with a D2D communication channel between the transmitting wireless device and the receiving wireless device (referred to as "D2D channel state information"). The receiving wireless device may estimate the D2D channel state information based on the reference signal communicated by the transmitting wireless device.

For example, the receiving wireless device may estimate the pathloss between the transmitting wireless device and the receiving wireless device based on the received reference signal. In these and other embodiments, based on the received reference signal, the receiving wireless device may determine channel quality information (CQI) associated with the D2D channel between the transmitting wireless device and the receiving wireless device. Additionally, the receiving wireless device may determine a power margin indicator (PMI) and/or a refractive index (RI) of the D2D channel based on the received reference signal. At step 210, the receiving wireless device may communicate the determined D2D channel state information to the access point.

At step 212, the transmitting wireless device may communicate a transmission request to the access point. The transmission request may indicate that the transmitting wireless device is requesting to transmit a D2D signal to the receiving wireless device. In some embodiments, the transmitting wireless device may communicate the transmission request on a physical uplink control channel (PUCCH), a physical uplink shared channel (PUSCH), or on some other channel.

At step 214, the access point may determine D2D transmission parameters associated with the transmission of the D2D signal from the transmitting wireless device to the receiving wireless device. The D2D transmission parameters may include D2D communication scheduling information such as a frequency range for the D2D signal and a time slot for the transmission of the D2D signal. Additionally, the transmission parameters may include the PMI associated with the D2D channel, a transmission power for the D2D signal, and/or hybrid automatic repeat request (HARD) information.

Additionally, in some embodiments, the transmission parameters may include a pair identifier that the access point may assign to the D2D pair. The pair identifier may be used by the transmitting wireless device to scramble the D2D signal transmitted to the receiving wireless device and may be used by the receiving wireless device to descramble the D2D signal received from the transmitting wireless device. Additionally, the pair identifier may be used to scramble other D2D related signals communicated to the access point by the transmitting wireless device and/or the receiving wireless device or D2D related signals communicated from the receiving wireless device to the transmitting wireless device. The pair identifier may thus allow for increased security in the D2D related communication by protecting the D2D related communication from eavesdropping. Additionally, the pair identifier may allow the transmitting wireless device and the receiving wireless device to not have to expose sensitive information such as, but not limited to, their location, unique equipment identifiers, etc., to each other and/or other wireless devices In some embodiments, the pair identifier may be a D2D radio network temporary identifier (D2D-RNTI).

In some embodiments, the transmission parameters may also include a demodulation reference signal. The demodulation reference signal may be used by the receiving wireless device to demodulate the D2D signal received from the transmitting wireless device.

At step 216 the access point may communicate the transmission parameters to the transmitting wireless device such that the access point may direct the transmitting wireless device to transmit the D2D signal to the receiving wireless device based on the transmission parameters. At step 218, the access point may also communicate the transmission parameters to the receiving wireless device such that the receiving wireless device may listen for the D2D signal from the transmitting wireless device based on the transmission parameters.

In some embodiments, the access point may communicate the pair identifier (e.g., the D2D-RNTI) assigned in step 214 to the transmitting wireless device and the receiving wireless device before communicating the other transmission parameters to the transmitting wireless device and the receiving wireless device. Accordingly, the access point may communicate the remaining transmission parameters using the pair identifier, and the transmitting wireless device and the receiving wireless device may listen for the other transmission parameters using the pair identifier.

In some embodiments, the access point may determine and communicate the transmission parameters in response to receiving the transmission request from the transmitting wireless device. In some embodiments, the access point may include the transmission parameters in downlink control information (DCI) or other information communicated to the transmitting wireless device and the receiving wireless device. Note that steps 216 and 218 may occur simultaneously or in a different order than in the illustrated embodiment. For example, the access point may communicate the transmission parameters to the receiving wireless device (step 218) before or at approximately the same time that the access point communicates the transmission parameters to the transmitting wireless device (step 216). The use of the pair identifier (e.g., the D2D-RNTI) in communicating the transmission parameters may allow for simultaneous communication to the transmitting wireless device and the receiving wireless device.

At step 220, the transmitting wireless device may communicate the D2D signal to the receiving wireless device based on the transmission parameters. For example, the transmitting wireless device may communicate the D2D signal over a frequency and at a time slot indicated by scheduling information that may be included in the transmission parameters determined by the access point. Alternately or additionally, the transmitting wireless device may transmit the D2D signal using the pair identifier included in the transmission parameters. Alternately or additionally, the transmitting wireless device may transmit the D2D signal at a power level indicated by the transmission parameters.

At step 222, the receiving wireless device may listen for the D2D signal based on the transmission parameters received from the access point. For example, the receiving wireless device may listen for the D2D signal at the time slot and frequency designated by the transmission parameters. Additionally, the receiving wireless device may use the pair identifier to attempt to descramble received wireless signals such that the receiving wireless device may descramble the D2D signal if the receiving wireless device receives the D2D signal. Note, that certain aspects of steps 220 and 222 may occur simultaneously based on the transmission parameters determined by the access point. That is, the transmitting wireless device may communicate the D2D signal to the receiving wireless device at the same time (e.g., the time slot designated in the transmission parameters) that the receiving wireless device is listening for the D2D signal.

At step 224, the receiving wireless device may communicate a feedback signal to the access point. The feedback signal may include information regarding the receipt of the D2D signal by the receiving wireless device. For example, if the receiving wireless device receives the D2D signal, the feedback signal may include an acknowledge (ACK) signal indicating to the access point that the receiving wireless device received the D2D signal from the transmitting wireless device. In contrast, if the receiving wireless device does not receive the D2D signal, the feedback signal may include a negative acknowledge (NACK) signal indicating to the access point that the receiving wireless device did not receive the D2D signal from the transmitting wireless device. In these and other embodiments, the feedback signal may also include channel information associated with the D2D channel between the transmitting wireless device and the receiving wireless device. For example, the feedback signal may also include pathloss, CQI, PMI and RI associated with the D2D channel between the transmitting wireless device and the receiving wireless device. Further, the feedback signal may include received power information associated with the power of the D2D signal as received by the receiving wireless device In some embodiments, the receiving wireless device may communicate the feedback signal to the access point via a PUCCH, PUSCH, or some other channel.

At step 226, the access point may determine subsequent transmission parameters in response to receiving the feedback signal. For example, in instances when the feedback signal includes a NACK signal, the access point may determine subsequent transmission parameters associated with instructing the transmitting wireless device to re-transmit the D2D signal.

In contrast, in instances when the feedback signal includes an ACK signal, the access point may determine subsequent transmission parameters associated with instructing the transmitting wireless device to transmit a subsequent D2D signal to the receiving wireless device if the transmitting wireless device has more data to send to the receiving wireless device. In these or other embodiments, the access point may determine the subsequent transmission parameters in response to receiving the ACK signal and another transmission request from the transmitting wireless device indicating that the transmitting wireless device desires to transmit more information to the receiving wireless device. In other embodiments, the transmission request transmitted at step 212 may indicate that the transmitting wireless device has data to send to the receiving wireless in more than one D2D transmission.

The access point may also determine other subsequent transmission parameters (e.g., transmission power, time slot, frequency etc.) based on the ACK signal, the NACK signal and/or other information (e.g., the channel state information) included in the feedback signal. For example, if the feedback signal includes a NACK signal, the access point may instruct the transmitting wireless device to increase the signal power of the re-transmitted D2D signal.

At step 228, the access point may communicate the subsequent transmission parameters to the transmitting wireless device such that the transmitting wireless device may be configured to re-transmit the D2D signal or transmit the subsequent D2D signal based on the subsequent transmission parameters. At step 230, the access point may communicate the subsequent transmission parameters to the receiving wireless device such that the receiving wireless device may be configured to receive the re-transmitted D2D signal or the subsequent D2D signal based on the subsequent transmission parameters. As with the transmission parameters transmitted at steps 216 and 218, the subsequent transmission parameters may be included in downlink control information or in other information, and may be transmitted using the pair identifier assigned to the transmitting wireless device and the receiving wireless device (e.g., the D2D-RNTI). Note also that steps 228 and 230 may occur simultaneously or in a different order than in the illustrated embodiment. For example, the access point may communicate the subsequent transmission parameters to the receiving wireless device (step 230) before or at the same time that the access point communicates the subsequent transmission parameters to the transmitting wireless device (step 228). Similar to above, the use of the pair identifier (e.g., the D2D-RNTI) in communicating the subsequent transmission parameters may allow for simultaneous communication to the transmitting wireless device and the receiving wireless device.

As described, the signaling sequence 200 may be used to supervise D2D communication between the transmitting wireless device and the receiving wireless device. Further, as described above, the direction and managing of the D2D communication may be performed by the access point that may be servicing the transmitting wireless device and the receiving wireless device.

One skilled in the art will appreciate that, for this and other processes and methods disclosed herein, the functions performed in the processes and methods of the signaling sequence 200 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Additionally, the terms "transmitting" and "receiving" are used to describe wireless devices acting in these capacities during D2D communication. Therefore, each wireless device in a D2D pair may perform actions as a transmitting wireless device or a receiving wireless device at a particular time. Further, in some embodiments, a wireless device of a D2D pair may also be included in another D2D pair.

Figure 3:
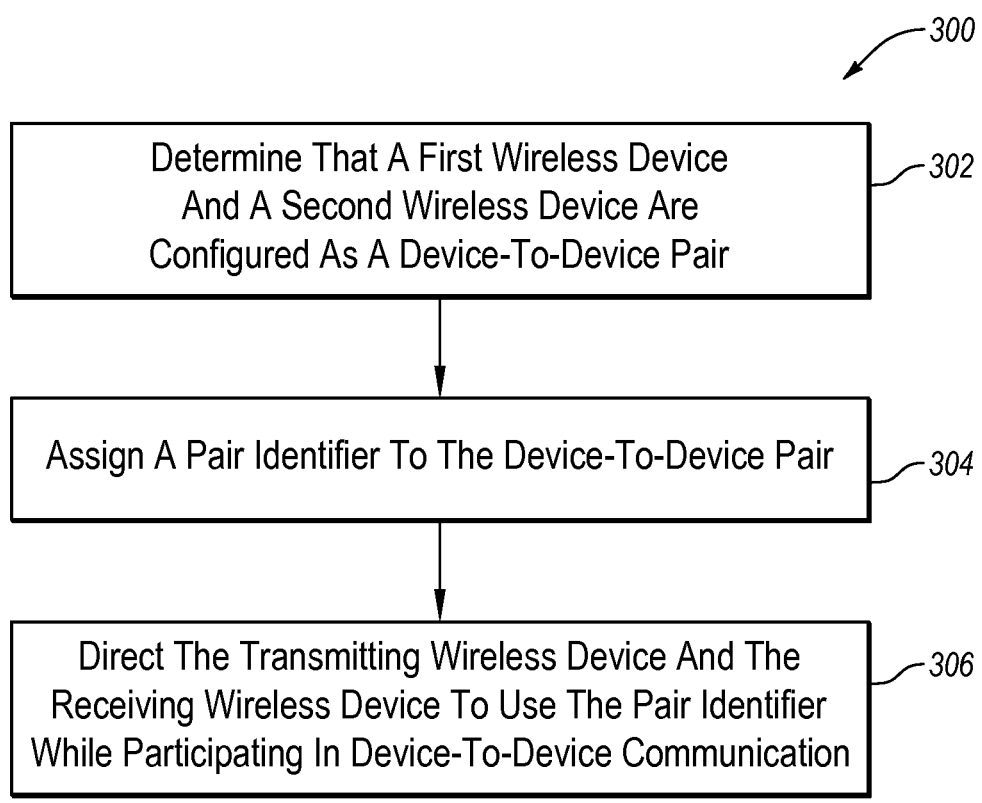
FIG. 3 is a flow chart of an example method of wireless network supervised D2D communication.

FIG. 3 is a flow chart of an example method 300 of wireless network supervised D2D communication, according to at least some embodiments of the present disclosure. The method 300 may be implemented, in some embodiments, by a wireless communication network, such as the network 100 described with respect to FIG. 1. For instance, the access point 102 of FIG. 1 may be configured to execute computer instructions to perform one or more operations for supervising D2D communication between wireless devices, as represented by one or more blocks of the method 300. Although illustrated as discrete blocks, various blocks may be divided into additional blocks, combined into fewer blocks, or eliminated, depending on the desired implementation.

The method 300 may begin at block 302, where it may be determined that a first wireless device and a second wireless device are configured to communicate with each other through D2D communication as a D2D pair. In some embodiments, this determination may be made by an access point based on the access point receiving information from the first wireless device and/or the second wireless device. In these or other embodiments, the access point may make this determination based on the access point instructing the first and second wireless devices to initiate D2D communication.

At block 304, a pair identifier may be assigned to the D2D pair that includes the first and second wireless devices. As mentioned above, the pair identifier may allow the D2D pair to communicate with each other and the access point while protecting the D2D related communications from eavesdropping. Additionally, as mentioned above, in some embodiments the pair identifier may be an RNTI. At block 306, the first wireless device and the second wireless device may be directed to use the pair identifier while participating in D2D communication.

Therefore, the method 300 may be used to effectuate wireless communication network supervision of D2D communication. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 300 may further include steps associated with instructing the first wireless device to communicate a D2D signal to the second wireless device and receiving feedback information associated with the second wireless device receiving or not receiving the D2D signal. Additionally, the method 300 may include steps associated with communicating transmission parameters (e.g., signal power, scheduling information, etc.) to the first and second wireless devices.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of supervising device-to-device communication, the method comprising:
   determining that a first wireless device and a second wireless device are configured to communicate with each other through device-to-device communication as a device-to-device pair;
   assigning a pair identifier to the device-to-device pair, the pair identifier configured to allow the device-to-device pair to communicate with each other through device-to-device communication while protecting from eavesdropping and the pair identifier configured to allow the first wireless device and the second wireless device to communicate with an access point of a wireless communication network with respect to the device-to-device communication while protecting from eavesdropping;
   communicating, by the access point, the pair identifier to the first wireless device and the second wireless device;
   communicating, by the access point, one or more device-to-device transmission parameters to the first wireless device and the second wireless device, wherein communication of the one or more device-to-device transmission parameters is scrambled using the pair identifier and wherein the one or more device-to-device transmission parameters include one or more of the following: a frequency range for device-to-device communication between the first wireless device and the second wireless device, a time slot for device-to-device communication between the first wireless device and the second wireless device, a power margin indicator associated with a device-to-device channel between the first wireless device and the second wireless device, and a transmission power for device-to-device communication between the first wireless device and the second wireless device;
   directing the first wireless device and the second wireless device to scramble device-to-device communications between each other using the pair identifier;
   directing the first wireless device and the second wireless device to scramble, using the pair identifier, one or more communications to the access point that are related to device-to-the device communication between the first wireless device and the second wireless device; and
   directing the first wireless device and the second wireless device to perform the device-to-device communication based on the one or more device-to-device transmission parameters.

2. The method of claim 1, further comprising communicating a demodulation reference signal to the second wireless device such that the second wireless device is configured to demodulate a device-to-device signal received by the second wireless device from the first wireless device based on the demodulation reference signal.

3. The method of claim 1, further comprising:
   instructing the first wireless device to communicate a device-to-device signal to the second wireless device;
   receiving an acknowledge signal from the second wireless device indicating that the second wireless device received the device-to-device signal from the first wireless device; and
   instructing the first wireless device to communicate a subsequent device-to-device signal to the second wireless device in response to receiving the acknowledgement signal.

4. The method of claim 1, further comprising:
   instructing the first wireless device to communicate a device-to-device signal to the second wireless device;
   receiving a negative acknowledge signal from the second wireless device indicating that the second wireless device did not receive the device-to-device signal from the first wireless device; and
   instructing the first wireless device to re-communicate the device-to-device signal to the second wireless device in response to receiving the negative acknowledgement signal.

5. The method of claim 1, further comprising instructing the first wireless device to adjust a power level associated with a device-to-device signal transmitted to the second wireless device from the first wireless device based on a feedback signal received by the access point from the second wireless device, the feedback signal indicating information associated with the device-to-device communication between the first wireless device and the second wireless device.

6. The method of claim 5, wherein the feedback signal includes at least one of an acknowledge signal, a negative acknowledge signal, channel state information, received power information, a pathloss, and channel quality information.

7. The method of claim 1, wherein the one or more transmission parameters include: the power margin indicator associated with a device-to-device channel between the first wireless device and the second wireless device; and the transmission power for device-to-device communication between the first wireless device and the second wireless device.

8. A processor configured to execute computer instructions to cause a system to perform operations for supervising device-to-device communication, the operations comprising:
   determining that a first wireless device and a second wireless device are configured to communicate with each other through device-to-device communication as a device-to-device pair;
   assigning a pair identifier to the device-to-device pair, the pair identifier configured to allow the device-to-device pair to communicate with each other through device-to-device communication while protecting from eavesdropping and the pair identifier configured to allow the first wireless device and the second wireless device to communicate with an access point of a wireless communication network with respect to the device-to-device communication while protecting from eavesdropping;
   communicating, by the access point, the pair identifier to the first wireless device and the second wireless device;
   communicating, by the access point, one or more device-to-device transmission parameters to the first wireless device and the second wireless device, wherein communication of the one or more device-to-device transmission parameters is scrambled using the pair identifier and wherein the one or more device-to-device transmission parameters include one or more of the following: a frequency range for device-to-device communication between the first wireless device and the second wireless device, a time slot for device-to-device communication between the first wireless device and the second wireless device, a power margin indicator associated with a device-to-device channel between the first wireless device and the second wireless device, and a transmission power for device-to-device communication between the first wireless device and the second wireless device;

directing the first wireless device and the second wireless device to scramble device-to-device communications between each other using the pair identifier;

directing the first wireless device and the second wireless device to scramble, using the pair identifier, one or more communications to the access point that are related to device-to-the device communication between the first wireless device and the second wireless device; and directing the first wireless device and the second wireless device to perform the device-to-device communication based on the one or more device-to-device transmission parameters.

9. The processor of claim 8, wherein the operations further comprise communicating a demodulation reference signal to the second wireless device such that the second wireless device is configured to demodulate a device-to-device signal received by the second wireless device from the first wireless device based on the demodulation reference signal.

10. The processor of claim 8, wherein the operations further comprise:

instructing the first wireless device to communicate a device-to-device signal to the second wireless device;

receiving an acknowledge signal from the second wireless device indicating that the second wireless device received the device-to-device signal from the first wireless device; and instructing the first wireless device to communicate a subsequent device-to-device signal to the second wireless device in response to receiving the acknowledgement signal.

11. The processor of claim 8, wherein the operations further comprise:

instructing the first wireless device to communicate a device-to-device signal to the second wireless device;

receiving a negative acknowledge signal from the second wireless device indicating that the second wireless device did not receive the device-to-device signal from the first wireless device; and instructing the first wireless device to re-communicate the device-to-device signal to the second wireless device in response to receiving the negative acknowledgement signal.

12. The processor of claim 8, wherein the operations further comprise instructing the first wireless device to adjust a power level associated with a device-to-device signal transmitted to the second wireless device from the first wireless device based on a feedback signal received by the access point from the second wireless device, the feedback signal indicating information associated with the device-to-device communication between the first wireless device and the second wireless device.

13. The processor of claim 12, wherein the feedback signal includes at least one of an acknowledge signal, a negative acknowledge signal, channel state information, received power information, a pathloss, and channel quality information.

14. The processor of claim 8, wherein the one or more transmission parameters include: the power margin indicator associated with a device-to-device channel between the first wireless device and the second wireless device; and the transmission power for device-to-device communication between the first wireless device and the second wireless device.

15. A method of participating in device-to-device communication, the method comprising:

establishing, by a first wireless device, device-to-device communication with a second wireless device, the first wireless device and the second wireless device becoming a device-to-device pair;

receiving a pair identifier assigned to the device-to-device pair, the pair identifier configured to allow the device-to-device pair to communicate with each other through device-to-device communication while protecting from eavesdropping and the pair identifier configured to allow the first wireless device and the second wireless device to communicate with an access point of a wireless communication network with respect to the device-to-device communication while protecting from eavesdropping;

receiving, by the first wireless device from the access point, a scrambled communication that includes one or more device-to-device transmission parameters, the scrambled communication being scrambled based on the pair identifier and the one or more device-to-device transmission parameters including one or more of the following: a frequency range for device-to-device communication between the first wireless device and the second wireless device, a time slot for device-to-device communication between the first wireless device and the second wireless device, a power margin indicator associated with a device-to-device channel between the first wireless device and the second wireless device, and a transmission power for device-to-device communication between the first wireless device and the second wireless device;

descrambling the device-to-device transmission parameter based on the pair identifier; and participating, by the first wireless device, in the device-to-device communication with the second wireless device based on the one or more device-to-device transmission parameters, the device-to-device communication including one or more device-to-device signals that are scrambled and descrambled based on the pair identifier.

16. The method of claim 15, further comprising:

transmitting, by the first wireless device, a first device-to-device signal to the second wireless device; and transmitting, by the first wireless device, a second device-to-device signal to the second wireless device in response to the access point receiving an acknowledge signal from the second wireless device, the acknowledge signal indicating that the second wireless device received the first device-to-device signal from the first wireless device.

17. The method of claim 15, further comprising:

transmitting, by the first wireless device, a device-to-device signal to the second wireless device; and re-transmitting, by the first wireless device, the device-to-device signal to the second wireless device in response to the access point receiving a negative acknowledge signal from the second wireless device, the negative acknowledge signal indicating that the second wireless device did not receive the device-to-device signal from the first wireless device.

18. The method of claim 15, further comprising adjusting a power level associated with the device-to-device communication between the first wireless device and the second wireless device based on a feedback signal received by the access point from the second wireless device, the feedback signal indicating information associated with the device-to-device communication between the first wireless device and the second wireless device.

19. The method of claim 18, wherein the feedback signal includes at least one of an acknowledge signal, a negative acknowledge signal, channel state information, received power information, a pathloss, and channel quality information.

20. The method of claim 15, wherein the one or more transmission parameters include: the power margin indicator associated with a device-to-device channel between the first wireless device and the second wireless device; and the transmission power for device-to-device communication between the first wireless device and the second wireless device.

21. A processor configured to execute computer instructions to cause a system to perform operations for participating in device-to-device communication, the operations comprising:
establishing, by a first wireless device, device-to-device communication with a second wireless device, the first wireless device and the second wireless device becoming a device-to-device pair;
receiving a pair identifier assigned to the device-to-device pair, the pair identifier configured to allow the device-to-device pair to communicate with each other through device-to-device communication while protecting from eavesdropping and the pair identifier configured to allow the first wireless device and the second wireless device to communicate with an access point of a wireless communication network with respect to the device-to-device communication while protecting from eavesdropping;
receiving, by the first wireless device from the access point, a scrambled communication that includes one or more device-to-device transmission parameters, the scrambled communication being scrambled based on the pair identifier and the one or more device-to-device transmission parameters including one or more of the following: a frequency range for device-to-device communication between the first wireless device and the second wireless device, a time slot for device-to-device communication between the first wireless device and the second wireless device, a power margin indicator associated with a device-to-device channel between the first wireless device and the second wireless device, and a transmission power for device-to-device communication between the first wireless device and the second wireless device;
descrambling the device-to-device transmission parameter based on the pair identifier; and
participating, by the first wireless device, in the device-to-device communication with the second wireless device based on the one or more device-to-device transmission parameters, the device-to-device communication including one or more device-to-device signals that are scrambled and descrambled based on the pair identifier.

22. The processor of claim 21, wherein the operations further comprise:
directing transmission of a first device-to-device signal from the first wireless device to the second wireless device; and
directing transmission of a second device-to-device signal from the first wireless device to the second wireless device in response to the access point receiving an acknowledge signal from the second wireless device, the acknowledge signal indicating that the second wireless device received the first device-to-device signal from the first wireless device.

23. The processor of claim 21, wherein the operations further comprise:
directing transmission of a device-to-device signal from the first wireless device to the second wireless device; and
directing re-transmission of the device-to-device signal from the first wireless device to the second wireless device in response to the access point receiving a negative acknowledge signal from the second wireless device, the negative acknowledge signal indicating that the second wireless device did not receive the device-to-device signal from the first wireless device.

24. The processor of claim 21, wherein the operations further comprise adjusting a power level associated with the device-to-device communication between the first wireless device and the second wireless device based on a feedback signal received by the access point from the second wireless device, the feedback signal indicating information associated with the device-to-device communication between the first wireless device and the second wireless device.

25. The processor of claim 24, wherein the feedback signal includes at least one of an acknowledge signal, a negative acknowledge signal, channel state information, received power information, a pathloss, and channel quality information.

26. The processor of claim 21, wherein the one or more transmission parameters include: the power margin indicator associated with a device-to-device channel between the first wireless device and the second wireless device; and the transmission power for device-to-device communication between the first wireless device and the second wireless device.

* * * * *